UNITED STATES PATENT OFFICE.

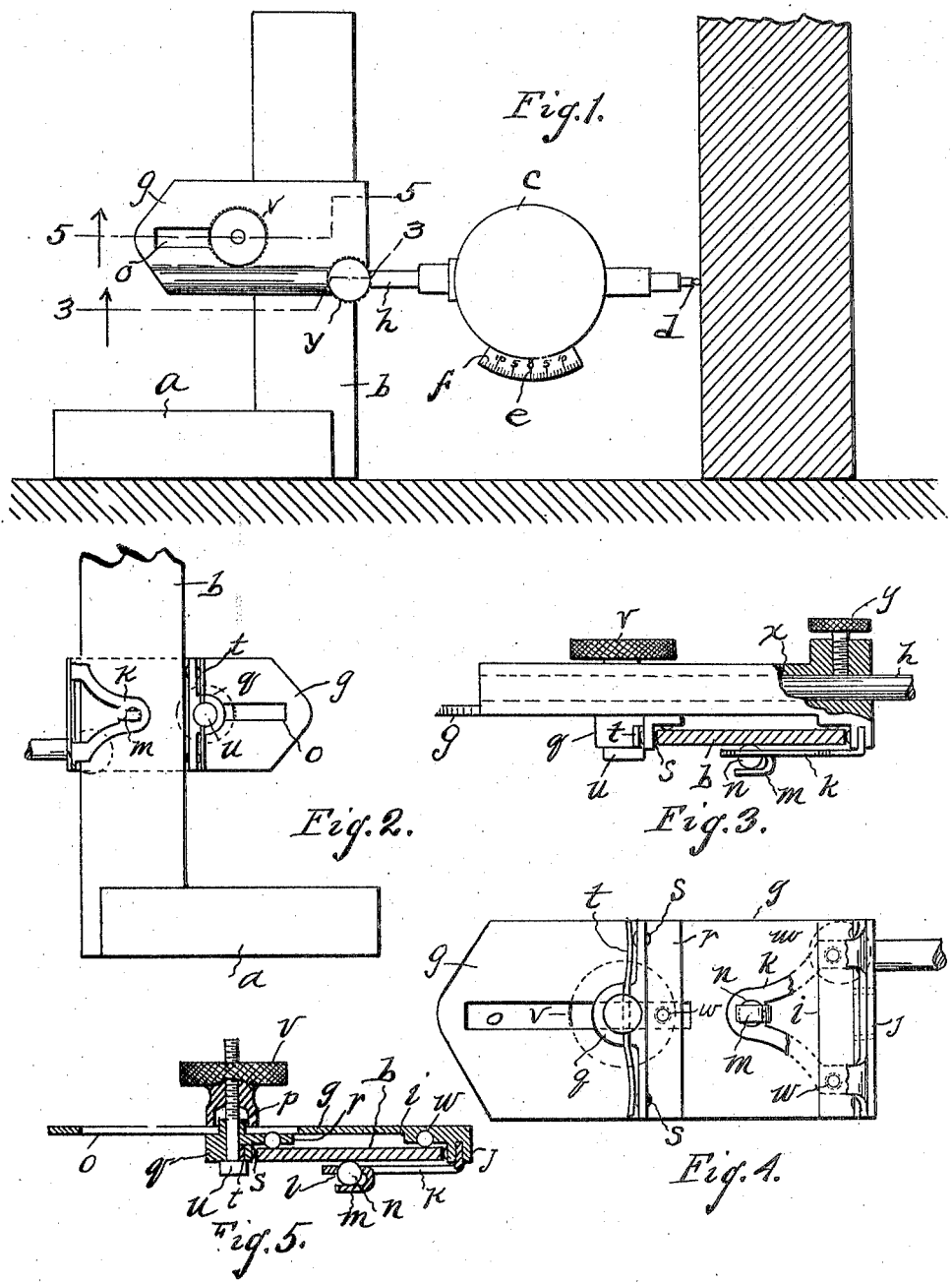

HUGO JANTSCH AND WALTER E. GULDAGER, OF DETROIT, MICHIGAN.

PERPENDICULARITY-INDICATOR.

1,345,597.   Specification of Letters Patent.   Patented July 6, 1920.

Application filed March 1, 1919. Serial No. 279,936.

*To all whom it may concern:*

Be it known that we, HUGO JANTSCH, a citizen of Bohemia, and WALTER E. GULDAGER, a subject of the King of Denmark, residing at Detroit, county of Wayne, State of Michigan, have invented a new and useful Improvement in Perpendicularity-Indicators, of which the following is a specification.

This invention relates to an instrument for indicating variations from a true condition of perpendicularity. In accurate machine work heretofore it has been customary to use a try-square to determine whether a given piece of work was perpendicular to the surface on which the try-square is rested. It has been usual to place the piece of work or other object on a level surface, then move the try-square up against the object and test for perpendicularity by drawing strips of paper between the try-square and the object. By noting whether they draw through easily or with difficulty, the operator is able to estimate the proximity of the surface of the object to a perpendicular condition. Obviously the operator cannot tell the amount of variation within precise limits and it is also a rather difficult job, usually requiring two men to perform this, one man to hold the try-square and the other to draw the paper between the upright arm of the try-square and the object.

It is the object of the present invention to provide an instrument for accomplishing this purpose which will accurately indicate any variation from perpendicularity and which can be easily manipulated by one operator.

In the drawings,—

Figure 1 is a side elevation showing the instrument in position to measure the perpendicularity of an object to a surface upon which it rests.

Fig. 2 is a rear elevation of the try-square equipped with the indicator carrier.

Fig. 3 is a section taken on the line 3—3 of Fig. 1.

Fig. 4 is an inside elevation of the indicator carrier; in fact, a view of the carrier from a position underneath Fig. 3.

Fig. 5 is a section on the line 5—5 of Fig. 1.

A try-square is shown in elevation in Fig. 1 and comprises the usual thick arm $a$ and the thin arm $b$. $c$ is an indicator well known in machine work for indicating accurately variations of thousandths of an inch or less. It comprises a case in which is set the mechanism, which needs no description, as these articles are old and can be bought upon the market. $d$ is a spring-projected stem or plunger which is connected with the interior mechanism so that any movement inward of the stem is accurately registered by the pointer $e$, which swings over the graduations $f$ that happen here to be in the form of a segment attached to the outside of the case. $h$ designates a spindle which supports the indicator.

The carrier comprises a slotted plate $g$ provided at one edge with a thickened portion to act as a seat $i$ and a support $j$. The latter is slotted to receive the turned-over end of the triangular-like flat spring $k$. This turned-over edge can be dowel-pinned in the support $j$. The plate and its thickened portion is a die casting, preferably. The spring is a stamping with an opening $l$ near the apex and a lug $m$ turned back to form a ball retainer for the ball $n$ that protrudes through the opening $l$. The slotted plate is provided with a slot $o$ into which accurately fits a squared or rectangular projection $p$ of the slide $q$, the latter of which has a reduced portion $r$ that forms a seat for the same purpose as the seat $i$ in the slotted plate. The inside surface of the support $j$ and the shoulder formed by the reduced portion at its juncture with the body of the slide $q$ form abutments, each of which is provided with two balls. The balls in one of these abutments are set into recesses and then a slight bit of the edge of the recess upset or swaged in on the balls so as to retain them. The balls in the other abutment, here shown as the abutment of the slide, are set in perforations of greater diameter on the outside than the ball but of less diameter on the inside of the ball, so that the balls $s$ may be let in from the back of the slide and held in place by the two spring arms of the flat spring $t$ (Figs. 2 and 4). This performs a very useful function in this connection, as will be explained later. The seats $i$ and $r$ are also provided with balls $w$ which are set in little sockets and then the edges of the socket swaged over the ball. The bolt $u$ passes through the slide and through the rectangular portion $p$. A thumb nut $v$ runs on the other end of the bolt.

By loosening the nut $v$ the slide may be slid along the slot $o$ so that the carrier may be placed over the thin arm $b$ of the try-square. By reason of the two seats $r$ and $i$ provided with balls $w$, the ball retained by the spring $k$ and the ball-set abutments, each surface of the carrier in contact with the arm of the try-square, is provided with anti-friction bearings. Hence the slide may be clamped up tight against the edges of the try-square arm, so there will not be the slightest rock of the carrier in sliding along the try-square arm edges, and by reason of the ball bearings the indicator carrier will slide easily along the arm.

Hence all that is necessary is to insert the spindle $h$ in the long opening $x$ in the bottom of the die-cast plate $g$ and secure it in any desired position of projection by the application of the set screw $y$.

By reason of the adjustable slide the carrier is applicable to try-squares of various widths of arms.

When a test is to be made of an object, all that is necessary to do is to make sure that the try-square is held non-movably in place with the edge of the thin leg facing the surface to be tested. The point of the stem $d$ can be moved up against the surface and then the carrier reciprocated up or down the arm $b$ of the try-square and the pointer watched to see whether there is any indication of variations and the amount can be noted.

The balls $s$ in the abutment of the slide which have yieldable sockets due to the spring $t$ serve to allow the carrier to slide along the arm of the try-square without binding, although there might be a very small irregularity in the arm or the edges not strictly parallel.

What we claim is:

1. An instrument for measuring variations in perpendicularity, having in combination, a try-square, an indicator carrier provided with anti-friction members so as to be freely slidable longitudinally on one of the transverse arms of the try-square, the said indicator carrier being provided with an adjustable slide having anti-friction members and arranged so that the carrier may closely but slidably engage four different surfaces of the arm to secure the same in substantially non-rockable relation to the arm in sliding, and an indicator provided with a stem which responds to variations in the surface being tested and which reciprocates in a path that has a near-right angular relation to the path of travel of the carrier.

2. An instrument for measuring variations in perpendicularity, having in combination, a try-square, a carrier provided with anti-friction members so as to be freely slidable on one of the arms of the try-square, said carrier being provided with a transverse slide having anti-friction members and arranged to cause the carrier to engage four surfaces of the said arm to avoid rocking movement in sliding, and an indicator supported on the carrier and provided with a spring-projected stem functioning in a line approaching the perpendicular with respect to the line of travel of the carrier on the arm.

3. An instrument for measuring variations in perpendicularity, having in combination, a try-square and a carrier comprising a plate for fitting one side and one edge of one of the arms of the try-square, means for engaging the other side of such arm to hold the plate to the arm, and a slide adjustable along the plate and against the other edge of such arm.

4. An instrument for measuring variations in perpendicularity, having in combination, a try-square and an indicator carrier slidable on one of the arms of the try-square and comprising a plate adapted to abut against one side and one edge of the arm, a spring carried by the plate bearing on the other side of the arm and a slide adjustable along the plate and bearing against the other edge of the arm.

5. An instrument for measuring variations in perpendicularity, having in combination, a try-square and an indicator carrier slidable on one of the arms and comprising a plate having an enlargement at one end forming an abutment, the enlargement of the plate adapted to bear against the side of the try-square arm and one edge of the arm, a slide adjustable along the plate adapted to bear on one side of the arm and the other edge of the arm, and a spring carried by one of the members adapted to bear against the other side of the try-square arm.

6. An instrument for measuring variations in perpendicularity, having in combination, a try-square and an indicator carrier slidable on one of the arms and comprising a plate provided with a thickened portion forming an abutment to bear against one edge of the arm and a seat to bear against one side of the arm, a slide slidable along the plate and provided with an abutment adapted to bear against the other edge of the arm and a seat adapted to bear against the side of the arm, and a spring carried by one of the members adapted to bear against the opposite side of the arm.

7. An instrument for measuring variations in perpendicularity, having in combination, a try-square and an indicator carrier slidable on one of the arms of the try-square and comprising a plate provided at one end with an abutment having balls set therein, means for engaging one side of such arm to hold the plate thereto, and a slide provided with an abutment with balls set therein, the said slide being adjustable along the plate so that the two abutments engage the opposite edges of the arm of the try-square.

8. An instrument for measuring variations in perpendicularity, having in combination, a try-square and an indicator carrier slidable on the try-square and comprising a plate provided with an abutment having balls set therein, means for engaging the side of the try-square to hold the plate thereto, a slide adjustable along the plate provided with an abutment having balls set therein, the balls in one of the abutments being provided with yieldable sockets.

9. An instrument for measuring variations in perpendicularity, having in combination, a try-square and an indicator carrier slidable on one of the arms of the try-square and comprising a plate provided with an abutment having balls seated therein, means for engaging the side of the arm to hold the plate thereto, a slide adjustable along the plate and provided with an abutment having balls set therein, and a flat spring having arms yieldingly pressing the balls of one of the abutments outward, the said two abutments adapted to engage two opposite edges of the arm of the try-square.

10. An instrument for measuring variations in perpendicularity, having in combination, a try-square and an indicator carrier slidable on one of the arms of the try-square and comprising a plate having a ball-set seat for one side of the try-square arm and a ball-set abutment to engage one of the edges of the arm, a slide adjustable along the plate provided with a ball-set seat to engage the side of the arm and an abutment set with the balls to engage the other edge of the arm, and a spring carried by one of the members adapted to carry a ball to engage the opposite side of the arm.

In witness whereof we have hereunto set our hands on the 25th day of February, 1919.

HUGO JANTSCH.
WALTER E. GULDAGER.